United States Patent [19]
Whitlock et al.

[11] Patent Number: 6,006,829
[45] Date of Patent: *Dec. 28, 1999

[54] FILTER FOR SUBTERRANEAN USE

[75] Inventors: Michael B. Whitlock; Stephen A. Geibel, both of Cortland; John D. Miller, Ithaca; Steven Mills, Cortland; Mark Hurwitz, Ithaca; Kenneth M. Williamson, Jamesville; Tanweer Haq, Tully, all of N.Y.

[73] Assignee: Oiltools International B.V., Amsterdam, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,621

[22] Filed: Jun. 6, 1997

Related U.S. Application Data

[60] Provisional application No. 60/019,666, Jun. 12, 1996.
[51] Int. Cl.⁶ .............................. E03B 3/22; E21B 43/00
[52] U.S. Cl. .......................................... 166/228; 166/236
[58] Field of Search ..................................... 166/227–236

[56] References Cited

U.S. PATENT DOCUMENTS

| | | |
|---|---|---|
| 717,420 | 12/1902 | Leeson . |
| 1,305,915 | 6/1919 | Mack . |
| 1,652,650 | 12/1927 | Watson et al. . |
| 2,104,339 | 1/1938 | Arutunoff . |
| 2,837,032 | 6/1958 | Horsting, Sr. ........................... 103/220 |
| 2,907,351 | 10/1959 | Rohrback et al. . |
| 3,561,603 | 2/1971 | Salomon ................................. 210/415 |
| 3,816,894 | 6/1974 | Howard et al. ..................... 29/163.5 F |
| 4,064,938 | 12/1977 | Fast .......................................... 166/236 |
| 4,415,613 | 11/1983 | Medney ...................................... 428/36 |
| 4,428,431 | 1/1984 | Landry et al. ........................... 166/298 |
| 4,476,925 | 10/1984 | Cox ....................................... 166/105.1 |
| 4,613,369 | 9/1986 | Koehler . |
| 4,624,319 | 11/1986 | Van Der Borght ...................... 166/369 |
| 4,821,800 | 4/1989 | Scott et al. ............................... 166/228 |
| 5,232,048 | 8/1993 | Whitebay et al. ....................... 166/228 |
| 5,318,119 | 6/1994 | Lowry et al. ............................ 166/228 |
| 5,339,895 | 8/1994 | Arterbury et al. ....................... 166/227 |
| 5,355,949 | 10/1994 | Sparlin et al. ........................... 166/236 |
| 5,411,084 | 5/1995 | Padden .................................... 166/230 |
| 5,624,560 | 4/1997 | Voll et al. ................................ 210/486 |
| 5,642,781 | 7/1997 | Richard ................................... 166/231 |
| 5,782,299 | 7/1998 | Simone et al. .......................... 166/230 |

FOREIGN PATENT DOCUMENTS

| | | |
|---|---|---|
| 0819831 | 1/1998 | European Pat. Off. . |
| 855068 | 11/1960 | United Kingdom . |
| 2267656 | 12/1993 | United Kingdom . |
| WO 9312323 | 6/1993 | WIPO . |
| WO 9618022 | 6/1996 | WIPO . |

OTHER PUBLICATIONS

"The Excluder", Baker Hughes INTEO, Houston, Texas, 1995 (4 pages).
"PoroPlus!", Purolator Products Company, Greensboro, North Carolina, 1997 (6 pages).

*Primary Examiner*—Roger Schoeppel
*Attorney, Agent, or Firm*—Leydig, Voit & Mayer, Ltd.

[57] ABSTRACT

A filter capable of being used in subterranean environments includes a filter medium. An erosion barrier is disposed along a common flow path with the filter medium for preventing erosion by particles in a fluid being filtered.

33 Claims, 4 Drawing Sheets

FILTER FOR SUBTERRANEAN USE

REFERENCE TO THE APPLICATION

This application claims the benefit of U.S. Provisional Application Ser. No. 60/019,666 filed on Jun. 12, 1996.

BACKGROUND OF THE INVENTION

1. Field of the Invention

This invention relates generally to filters for use in subterranean environments, such as in oil or gas wells, water wells, and geothermal wells, and in other applications in which it is desired to remove a liquid or gas from the ground without bringing soil particulates, such as sand or clay, up with the liquid or gas.

2. Description of the Related Art

Filters are frequently used in subterranean wells in order to remove particulates from liquids or gases produced by the wells. Typical particulates which need to be filtered out are sand and clay, and for this reason, well filters for this purpose are often referred to as sand screens.

A possible mode of failure of a well filter is one in which portions of the filter are eroded through by sand particles in the fluid being filtered. When the flow of fluid through the filter is slow, the erosion of the filter by the sand particles is quite gradual. However, under some circumstances, the fluid with the well is directed against the well filter at a high velocity, and the sand particles in the fluid produce an abrasive effect on the filter which is similar to sand blasting. Such high velocity fluid flows can occur when portions of the formation in which a well is formed become plugged up, so that fluids are forced through the unplugged portions at a higher velocity than normal. The sand in a high velocity fluid flow is able to abrade not only through the filter medium of a well filter but also through solid steel portions of the filter. Thus, high velocity flow of sand-containing fluids within a well can significantly shorten the lifespan of a well filter.

SUMMARY OF THE INVENTION

The present invention provides a well filter having excellent resistance to erosion by sand or other particles in well fluids.

The present invention also provides a filter arrangement including a well filter connected in series with a piece of well equipment, the filter having excellent resistance to erosion by particles in well fluids.

The present invention further provides a method of filtering a well fluid with a well filter.

A well filter according to one aspect of the present invention comprises a filter medium having an upstream side and a downstream side, and an erosion barrier disposed along a common flow path with the filter medium for preventing erosion of the filter by particles in a fluid being filtered. In preferred embodiments, the erosion barrier is disposed on the upstream side of the filter medium, but it may also be disposed on the downstream side or between portions of the filter medium.

The erosion barrier can have a variety of forms. According to one form of the present invention, the erosion barrier comprises a plurality of layers having a surface of an erosion resistant material disposed on the upstream side of the filter medium. Each layer has openings through which fluid can pass to reach the filter medium. The openings in different layers are staggered to prevent line-of-sight flow through the layers. In order to reach the filter medium, particles in the fluid being filtered must pass along a sinuous path, so the energy of the particles is attenuated, when the particles reach the filter medium, they no longer have sufficient energy to damage the filter medium. Accordingly, the filter can operate for long periods within a well, even when subjected to high velocity flows of fluid containing abrasive particles. The layers may comprise various materials, such as elastomers or other energy absorbing materials, dead soft materials, or extremely hard materials. Adjoining layers are preferably spaced from each other so that fluid can easily pass between the layers.

According to another form of the present invention, the erosion barrier comprises one or more mesh layers having a surface of a material resisting erosion by particles in a fluid being filtered.

In another form of the present invention, the erosion barrier comprises a porous layer of an erosion resistant material. The porous layer may comprise a foam of a resilient material, or it may comprise a porous matrix of particles having good erosion resistance joined to each other by a binder, for example.

The filter medium is not restricted to any particular shape or material and can be selected in accordance with the fluid to be filtered and the environment in which the filter is to be used.

The filter may include a wide variety of other components, such as a core or other support member for internally supporting the filter medium, an external protective member for protecting the outer periphery of the filter, and connectors for connecting the filter medium to a support member.

A filter according to the present invention can be employed in any desired manner in a wide variety of underground environments, such as in oil or gas wells, water wells, geothermal wells, groundwater remediation wells, and leaching ponds. For example, the filter can be used in cased hole gravel pack completion in which the filter is disposed inside a gravel pack in the production zone of an oil or gas well, in an open hole gravel pack in which the filter is disposed in a gravel pack without being surrounded by casing, in filtration without a gravel pack, in open hole completion in which the filter is introduced into a well as part of a well string and the formation surrounding the well bore is allowed to fall in on the filter, in slim hole completion in which the filter is installed in a drill string and left in the well with the drill string at the completion of drilling, in coiled tubing completions and workovers in which the filter is connected in series with coiled tubing, with wire-line in which the filter is lowered into a well by wire-line, for pump protection in which the filter is installed on or upstream of the inlet of a subsurface pump, in ground remediation in which underground fluids are brought to the surface via the filter or compressed air is passed through the filter to form air bubbles and perform air sparging, and in leaching ponds for filtering ion-containing liquids which leach from ores in the pond. Details of ways of using the filter in these and other environments are described in U.S. patent application Ser. No. 08/351,658, now U.S. Pat. No. 5,664,628, and International Application No. PCT/US95/15988, which are incorporated by reference. The filter can also be used in applications other than in wells in which the filter performs filtering of a fluid containing particles capable of abrading the filter.

DESCRIPTION OF PREFERRED EMBODIMENTS

Figure 1:
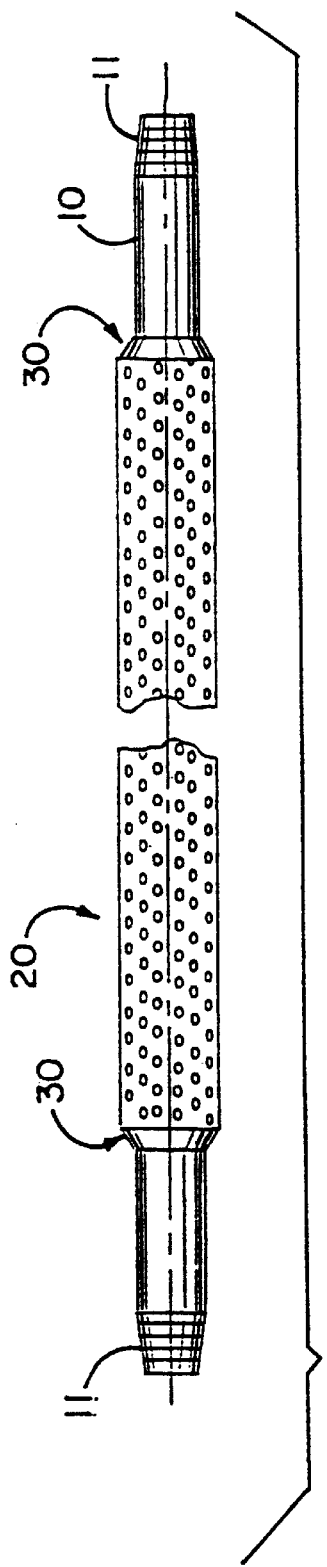
FIG. 1 is a plan view of an embodiment of a filter according to the present invention.

FIG. 1 illustrates an embodiment of a filter according to the present invention. The illustrated filter is intended for use within an oil or gas well to remove sand and other particulates from a fluid produced by the well, but as stated above, a filter according to the present invention can be used in a wide variety of applications and is not limited to use in a specific environment.

The filter includes an inner support member 10 and a filter body 20 disposed around the inner support member 10 and including a filter medium. Depending upon the structure of the filter body 20, the filter may also include end connectors 30 for connecting the filter body 20 to the inner support member 10 in a manner preventing particles to be filtered from bypassing the filter body 20 and for protecting the lengthwise ends of the filter body 20 against impacts. Examples of suitable end connectors are described in U.S. patent application Ser. No. 08/351,658, now U.S. Pat. No. 5,664,628, and U.S. Provisional Patent Application Ser. No. 60/017,089.

This embodiment is intended to be connected in series with a pipe string which is inserted into a well. The filter can be installed at any desired location in the pipe string, but usually it will be positioned near the bottom end of the string. The pipe string may include one or more of the filters, either connected directly with one another or separated by a length of pipe or other members. The filter can be deployed vertically, horizontally, or at any other angle within a well.

The filter will frequently include an inner support member 10 to provide rigidity to the filter and axially transport filtrate which has passed through the filter body 20 to an unillustrated conduit (such as a pipe string) connected to the inner support member 10 for transporting the filtrate outside the well. Usually, the inner support member 10 is a hollow, tubular member having perforations, pores, or other openings in its peripheral wall which permit fluid to flow into the hollow center of the inner support member 10, but the inner support member 10 need not be hollow as long as it is capable of transporting filtrate. For example, it may be a solid, porous member through which filtrate can flow axially, or it may be a solid member having axial channels in its outer surface for the transport of fluid. For reasons of strength, it is usually cylindrical, but other shapes may be employed, such as a shape with a polygonal or oval cross section, and the cross section may vary along its length. In the present embodiment, the inner support member 10 comprises a cylindrical pipe having a uniform cross section over most of its length and having perforations 12 for filtrate formed over a portion of its length in a region on which the filter body 20 is mounted. The inner support member 10 may be equipped with connecting portions at one or both of its ends to enable the inner support member 10 to be connected to other members. In FIG. 1, the inner support member 10 has an externally threaded pin 11 formed at each lengthwise end which can be screwed into an internally threaded box of a pipe or into a standard pipe connector for joining the pins of two pipes. When the filter is intended to be connected in series with a string of production pipe, a perforated production pipe is particularly suitable as the inner support member 10, since the threaded connectors of the production pipe will have the same strength as that of the connectors of the pipe string to which the filter is to be connected. If the inner support member 10 is expected to be subjected to only low tensile, torsional, or radial compressive forces, light-weight lockseam tubing or polymeric tubing may be employed for the inner support member 10. If the filter is to be installed at the tail end of a pipe string or other conduit, the lower end of the inner support member 10 may be closed off with a bull plug or similar member.

The inner support member 10 can be made of any material capable of withstanding the conditions to which the inner support member 10 is to be subjected during installation and use. When the inner support member 10 is formed from a length of production pipe (commonly referred to as a pipe joint), it will typically be made of steel.

The length of the inner support member 10 is not critical, and one or more filter bodies 20 can be mounted on a single inner support member 10. Members other than a filter body 20 and end connectors 30 can also be mounted on the inner support member 10, such as collars or conventional centralizers for guiding the filter as it is inserted into a well bore.

If the filter body 20 has sufficient strength, the inner support member 10 may be omitted.

The filter body 20 contains a filter medium which filters a well fluid to form a filtrate. The filter body 20 may have any structure capable of performing the intended removal of substances from the fluid being filtered. For example, it may be a prepacked body, a wire-wrapped body, a sintered metal unitary body, a wire mesh body, a resin-consolidated mass of particles, or any other type of filter body.

The filter body 20 need not have any particular shape. When the filter body 20 is mounted on an inner support member 10, the filter body 20 will typically have an inner periphery which is similar in shape to the outer periphery of the inner support member 10, and its outer periphery will usually be rounded (such as cylindrical) to make it easier for the filter body 20 to pass through well casing.

In most applications within a well, fluid will normally flow radially inward through the filter body 20 during filtration. However, in some applications, such as acidizing of a well, air sparging, water injection, and enhanced oil recovery applications, fluid may be directed radially outwards through the filter body 20.

Examples of filter bodies which are particularly suitable for use in wells for oil and gas and in other subterranean environments and which can be used in the present invention are disclosed in U.S. patent application Ser. No. 08/351,658, now U.S. Pat. No. 5,664,628. The filter bodies described in that application include a supported porous medium, which is a filter medium including a foraminate support member, such as a mesh, and particulates, such as powders and/or fibers, sintered to the foraminate support. A supported porous medium provides a filter having excellent damage resistance, meaning that the filter substantially retains its filtering integrity even when significantly deformed. An example of a supported porous medium for use in the present invention is a sintered supported porous metal sheet material disclosed in U.S. Pat. No. 4,613,369. This material, which is available from Pall Corporation under the trademark PMM, can be manufactured from a wide variety of metals, such as nickel, iron, chromium, copper, molybdenum, tungsten, zinc, tin, aluminum, cobalt, iron, and magnesium, as well as combinations of metals and metal alloys including boron-containing alloys. For a filter intended for use in a well for oil or gas, nickel/chromium alloys are particularly suitable. Of these, AISI designated stainless steels which contain nickel, chromium and iron are particularly preferred. Another example of a supported porous medium which is particularly suitable for use in subterranean environments is that manufactured by Pall Corporation under the designation PMF II.

In addition to some type of filter medium, the filter body 20 may include a variety of other layers and components, such as drainage layers to assist the flow of fluid into the filter medium and the flow of filtrate into the inner support member, cushioning layers to prevent abrasion of the filter medium, diffusion layers placed between layers of filter medium to permit edgewise flow of fluid, layers for selectively blocking flow through portions of the filter body, and a protective member, such as an outer cage or wrap, for protecting the filter body from erosion and damage.

Figure 3:
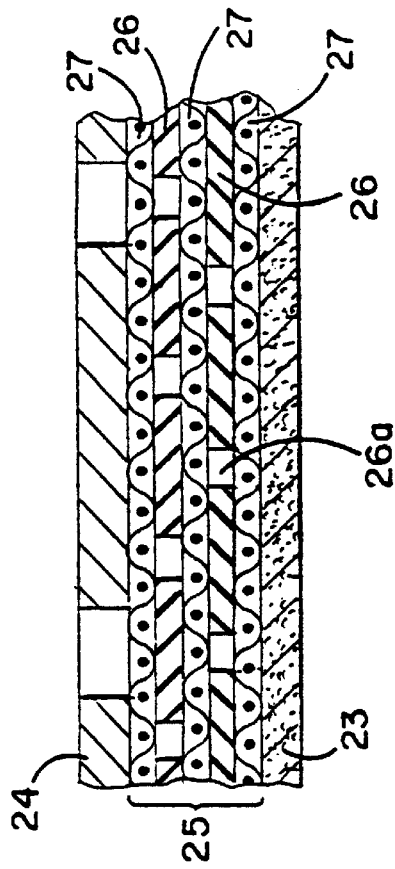
FIG. 3 is an enlarged cross-sectional view of the radial outer portion of the structure shown in FIG. 2.
Figure 2:
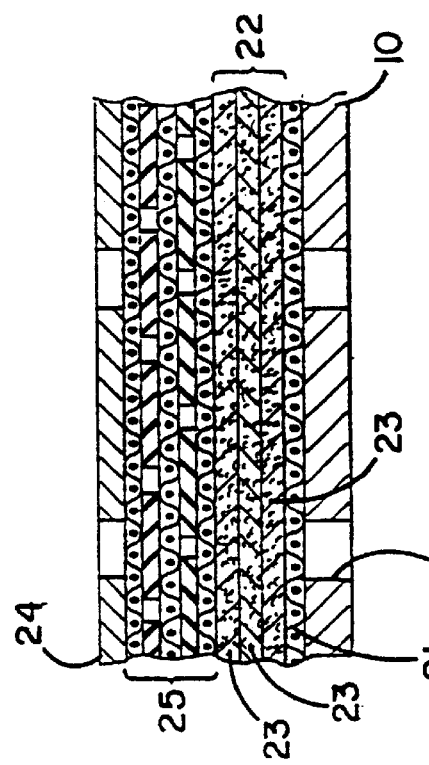
FIG. 2 is a longitudinal cross-sectional view of a portion of the embodiment of FIG. 1.

FIGS. 2 and 3 are longitudinal cross-sectional views of a portion of the filter body 20, FIG. 3 being an enlarged view of the radially outer region of the portion shown in FIG. 2. As shown in these figures, in the present embodiment, the filter body 20 includes an inner drainage layer 21 in the form of a mesh surrounding the inner support member 10 and a filtering portion 22 containing at least one filtering layer 23 (three layers in this example) of a sintered supported porous stainless steel filter medium available from Pall Corporation under the trademark PMM surrounding the inner drainage layer 21. The filtering layers 23 in this embodiment are wrapped around the inner support member 10, but they may instead be in the form of a pleated composite, such as one having axially extending pleats in a laid-over state. Examples of suitable methods of installing the filtering layers 23 on the inner support member 10 are described in U.S. patent application Ser. No. 08/351,658. An outer protective member in the form of a perforated cylindrical metal cage 24 is disposed around the filtering layers 23.

An erosion barrier 25 for preventing erosion of the filtering layers 23 by sand and other particles in the fluid being filtered is disposed on the upstream side of the filtering layers 23. When the filter is expected to undergo primarily radially inwards flow during filtration, the upstream side of the filtering layers 23 is the radially outer side. Therefore, in this embodiment, the erosion barrier 25 is disposed around the filtering layers 23. The illustrated erosion barrier 25 comprises a plurality of perforated energy absorbing layers 26 and a drainage layer 27 in the form of a mesh on each side of each energy absorbing layer 26.

The energy absorbing layers 26 can be made of any resilient materials having good energy absorbing properties, i.e., which can absorb the energy of particles which strike against them without chipping or breaking down. A few examples of suitable materials include elastomers, natural rubbers, and other resilient polymers. When the energy absorbing layers 26 need to resist acids or other corrosive liquids to which the filter may be exposed during operation in a well, Viton, which is a trademark of DuPont for a series of fluoroelastomers, is particularly suitable. Another example of an elastomer having excellent energy absorbing capability is a grade MP950 urethane sold by Harkness Urethane. An example of a suitable hardness for the energy absorbing layers 26 is a Shore A hardness of approximately 50 to approximately 95 and more preferably approximately 70 to approximately 90. The energy absorbing layers 26 need not be particularly thick in order to provide excellent protection against erosion, and a thickness of as little as 0.005 inches for each layer 26 may be suitable. There is no upper limit on the thickness, although as the thickness of the layers 26 increases, the space available for the other layers of the filter body 20 decreases. The layers 26 need not comprise an energy absorbing material over their entire thickness. For example, they may comprise a core of a material which is not resistant to erosion coated on one or both sides with an energy absorbing material. However, preferably at least the upstream surface of each layer 26 comprises an energy absorbing material, since the upstream surface is the surface most likely to be contacted by abrasive particles in the fluid being filtered.

The energy absorbing layers 26 are formed with a plurality of openings 26a through which the fluid to be filtered by the filtering layers 23 can pass. The size, number, and shape of the openings 26a in the layers 26 is not critical and can be selected based on the desired flow rate through the openings 26a. For example, in the present embodiment, the openings 26a are round holes with a diameter of ⅛ inch and a center-to-center spacing of ½ inch between adjoining holes. The openings 26a are preferably large enough and numerous enough so as not to block any substantial portion of the sand particles entering the filter body 20. In other words, the layers 26 are generally not intended to play any significant role in particle removal by the filter. Preferably, adjoining layers 26 in the radial direction are arranged such that the openings 26a in one layer 26 are staggered, i.e., not radially aligned with respect to the openings in the adjoining layer 26. If the layers 26 are so arranged, there will not be a direct line of sight between the outside of the filter and the filtering layers 23, and particles in the fluid being filtered must travel along a sinuous path in reaching the filtering layers 23, slowing down in the process and loosing their ability to erode the filtering layers 23.

The drainage layers 27 can be of any material having good edgewise flow characteristics so that fluid to be filtered can readily flow along the space between the outer cage 24 and the outermost layer 26, along the spaces between adjoining layers 26, and along the space between the innermost layers 26 and the outermost filtering layer 23. When the filter is intended to be used in a well for oil or gas, a particularly suitable type of drainage layer 27 is a mesh layer of a corrosion resistant material such as a metal or plastic. The various drainage layers 27 may be the same or different in structure from one another.

The energy absorbing layers 26 and the drainage layers 27 can be disposed around the filtering layers 23 in a variety of manners. For example, they can be wrapped spirally or helically around the filtering layers 23, or each layer 26, 27 may be in the form of a sleeve which is slid over the outside of the filtering layers 23. The different energy absorbing layers 26 may be discrete sheets of material, or they may be part of a single sheet of material which is wrapped around the filtering layers 23 a plurality of times to form the different layers. Similarly, the different drainage layers 27 may be discrete members or they may be integral with one another. For example, a composite of a sheet of an elastomeric material and a sheet of drainage material can be wrapped spirally around the filtering layers 23.

In the present embodiment, each of the energy absorbing layers 26 and each of the drainage layers 27 comprises a separate sheet which is wrapped cylindrically around the filtering layers 23 to form a cylinder. Each sheet has a length substantially equal to the length of the filter body 20. The two ends of a sheet are slightly overlapped in the circumferential direction of the filter and then joined to each other in a manner which will maintain the sheet in a cylindrical form until the outer cage 24 can be disposed around the layers 26, 27 to hold them in place. For example, the ends of the energy absorbing layers 26 can be held together with an adhesive or by running a hot wheel along the overlapping portions. When the drainage layers 27 comprise a metallic mesh, the overlapping ends can be joined to each other by light welding, for example.

Layers of materials other than elastomers or similar energy absorbing materials can be used to form the erosion barrier 25, and in general, any material having good erosion resistance to sand and other particles in the fluid being filtered can be used. For example, instead of a resilient elastomeric material, layers of a "dead soft" material of low resilience which can absorb the energy of particles which strike it without causing the particles to rebound can be used. Examples of soft materials which can be used to form a layer of low resilience are lead, tin, and Teflon. It is also possible for a layer of a harder material to be coated with a soft material of this type. Alternatively, the layers may be formed of or coated with an extremely hard material having a hardness greater than or equal to that of the particles in the fluid being filtered and which is capable of resisting the impact of the particles without chipping. Sand particles in well fluids typically have a hardness on the Mohs scale of around 7, so nonbrittle materials having a hardness greater than or equal to this can be used. A few examples of suitable materials are ceramics and extremely hard metals.

Figure 4:
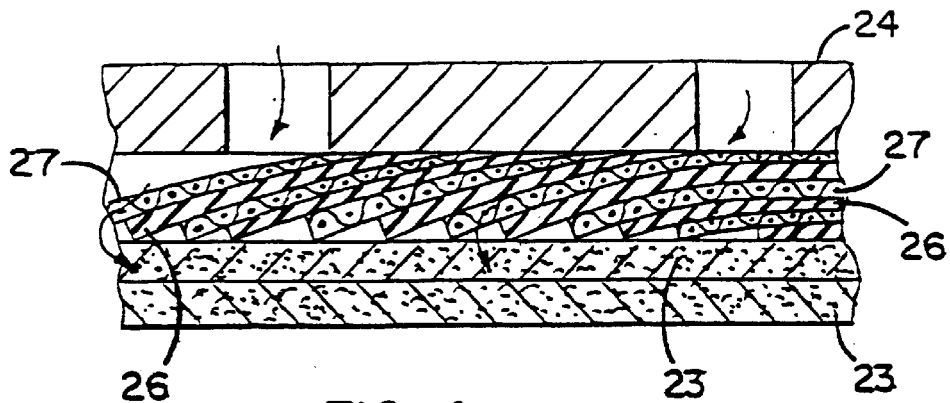
FIG. 4 is a longitudinal cross-sectional view of a variation of the erosion barrier of FIG. 2.

FIG. 4 illustrates a variation of the embodiment of FIG. 2. In this embodiment, energy absorbing layers 26 are formed of a single strip of an elastomeric material which is helically wound around the filtering layers 23 in a plurality of overlapping turns. Between consecutive turns of the elastomeric material, a strip of a drainage material such as a drainage mesh is also wrapped helically around the filtering layers 23 to form a plurality of drainage layers 27. Because of the presence of the drainage layers 27, a fluid being filtered can flow between consecutive energy absorbing layers 26 through the drainage layer 27 and into the filtering layers 23, as shown by the arrows in the figure. The energy absorbing layers 26 do not need to be perforated in this embodiment, since fluid can flow around the energy absorbing layers 26 rather than through them. Because of the overlap of consecutive energy absorbing layers 26, there is no direct line of sight between the outside of the filter and the filtering layers 23, so the energy of particles in the fluid being filtered is greatly attenuated before the particles reach the filtering layers 23. In addition, as the particles pass along the drainage layers 27 between the energy absorbing layers 26, they lose energy by contact with the layers 26. Thus, the ability of the particles to erode the filtering layers 23 is greatly decreased.

The strip of elastomeric material and the strip of drainage material can be disposed around the filtering layers 23 in the manner shown in FIG. 4 in various manners. For example, two strips can be placed face to face and then helically wrapped around the filtering layers 23 at the same time.

The geometry illustrated in FIG. 4 can be employed with materials other than elastomers. For example, the elastomer forming the energy absorbing layers 26 of FIG. 4 may be replaced by any of the materials described above with respect to the embodiment of FIG. 2, such as a soft metal, or a very hard material which cannot be eroded by particles in the fluid being filter.

Figure 5:
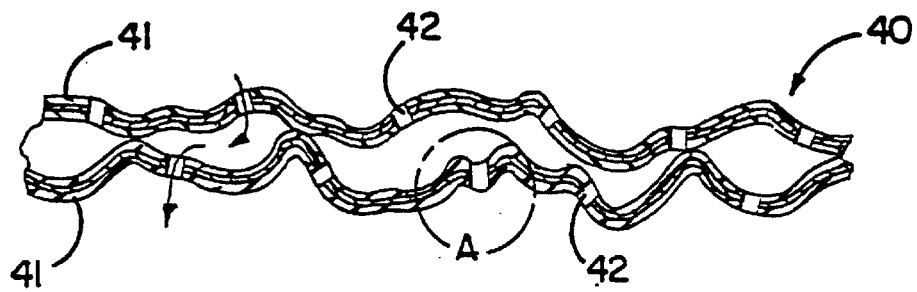
FIG. 5 is a longitudinal cross-sectional view of a portion of another embodiment of an erosion barrier for use in the present invention comprising embossed plates.

FIG. 5 is a longitudinal cross-sectional view of a portion of another embodiment of an erosion barrier 40 which can be employed in the present invention. This embodiment comprises a plurality of concentric, cylindrical layers formed by plates 41 having a surface formed of a material which is resistant to erosion by sand or other particles in a well fluid and which can reduce the energy of the particles so that when the particles reach the filtering layers 23 of the filter, they are at a sufficiently low velocity so as not to damage the filtering layers 23. Each plate 41 has a plurality of openings 42 formed in it for the passage of fluid to be filtered and particles in the fluid. The openings 42 can be of any desired size and shape but preferably are large enough not to block substantially any particles in the fluid being filtered. The two plates 41 are arranged so that the openings 42 in different plates 41 are not aligned, preventing line-of-sight flow between the filtering layers 23 and the outside of the filter. A generally annular space through which fluid can flow is maintained between the plates 41 by forming the plates 41 with surface irregularities which can contact the adjoining plate 41 or other adjoining surface and arranging the plates 41 so that the surface irregularities are non-nesting. The surface irregularities need not be of any particular shape. In FIG. 5, each of the plates 41 has been embossed with a wood grain pattern prior to being formed into a cylinder to create ridges and valleys which prevent the plates 41 from contacting each other except in discrete locations. The annular space between the plates 41 may serve various purposes. It may be used simply as a passage through which fluid can flow between adjoining plates 41. In addition, it may serve as a region in which sand and other particles can accumulate so as to act as a further barrier against intrusion of particles. If the outer plate 41 is eroded through in a localized area due, for example, to a high velocity stream of sand-containing well fluid impinging upon it, large quantities of sand will enter into the annular space between the two plates 41. Some of the sand particles will rebound out of the space, but others will accumulate in the space. As the number of particles which accumulate in the annular space increases, the particles can form a sort of annular plug of sand between the inner and outer plates 41 in the region where the outer plate 41 wore through. The high-velocity stream of sand will then impinge against the sand plug rather than against the inner plate 41, so the inner plate 41 can be protected against further erosion. Thus, the annular space can prevent erosion from extending all the way through the plates 41 to the filtering layers. Furthermore, the plug can prevent sand which enters the filter through an eroded region from migrating in the lengthwise direction of the filter and therefore can localize the effects of erosion. Generally, the larger the radial dimensions of the annular space the better, since if the annular space is too small, particles in a high velocity stream which enter the space may tend to bounce out. Since the plates 41 are not smooth and are contacting each other in multiple locations, the size of the annular space is not constant. However, on average, a radial dimension for the annular space of at least 1/8" and more preferably at least 1/4" may be suitable. The space can be either open or pre-filled with ceramic particles, a porous sand, a mesh, or other material which can resist erosion or which can inhibit particle migration through the space should large quantities of sand enter the space.

The plates 41 can themselves be made of a material having good erosion resistance, such as any of the materials described with respect to the erosion barrier 25 of FIG. 3, or the plates 41 can be coated on one or both surfaces with such a material. For example, the material can be a resilient energy absorbing material such as an elastomer, it can be a dead soft material of low resilience such as tin, lead, or Teflon, or it can be an extremely hard material which is capable of resisting the impact of particles in the fluid being filtered without chipping. A coating of an elastomer or a dead soft material can be applied to the plates 41 by a variety of methods, such as by hot dipping. Examples of applying a coating of an extremely hard material to the plates 41 include "tinning" in a furnace (suitable for a nickel brazing alloy and similar materials), flame spraying (suitable for ceramics and similar materials), electroplating (suitable for a hard chrome coating and similar materials), and vapor deposition (suitable for titanium nitride and similar materials). In the present embodiment, each plate 41 has a stainless steel core 43 coated on both sides with an elastomeric coating 44.

The number of plates 41 in the erosion barrier 40 is not restricted. At least two plates 41 may be desirable to prevent a line-of-sight path to the filtering layers 23, but even a single plate 41 can provide a large measure of erosion protection.

The erosion barrier 40 may be disposed around filtering layers 23 in the same location as the erosion barrier 25 of the embodiment of FIG. 2. The plates 41 may be formed into cylinders in advance and slipped axially over the filtering layers 23, or a flat plate can be bent around the filtering layers 23 into the form of a cylinder, and the adjoining or overlapping ends of the plate can be joined to each other by a method suitable to the materials of which the plate is formed. As still another method, a narrow, elongated plate 41 can be helically wrapped around the filtering layers 23 in a plurality of turns and joined to itself where adjoining turns abut or overlap. As yet another possibility, a single plate 41 may be wrapped spirally around the filtering layers 23 to form a plurality of concentric layers. If desired, a drainage layer may be disposed around the outer plate 41 or between the inner plate 41 and the filtering layers 23.

Figure 6:
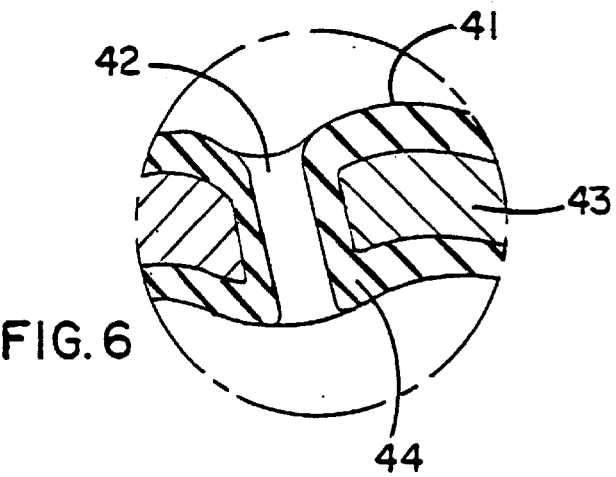
FIG. 6 is an enlarged view of region A of FIG. 5.
Figure 7:
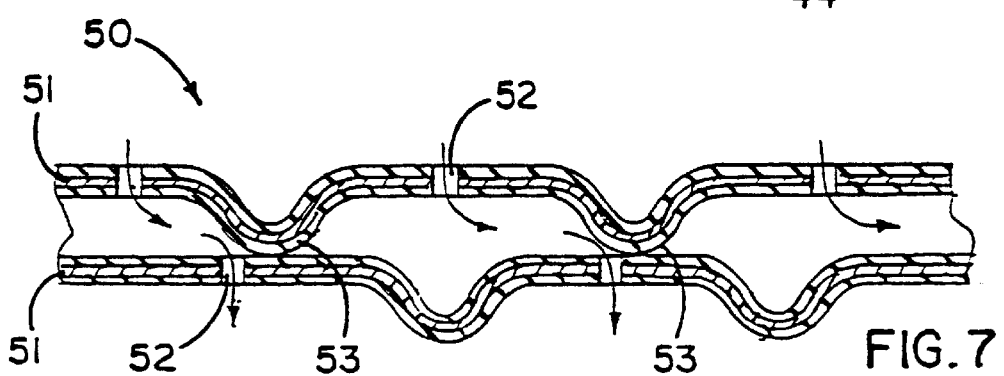
FIGS. 7 and 8 are longitudinal cross-sectional views of portions of other embodiments of erosion barriers for use in the present invention.
Figure 8:
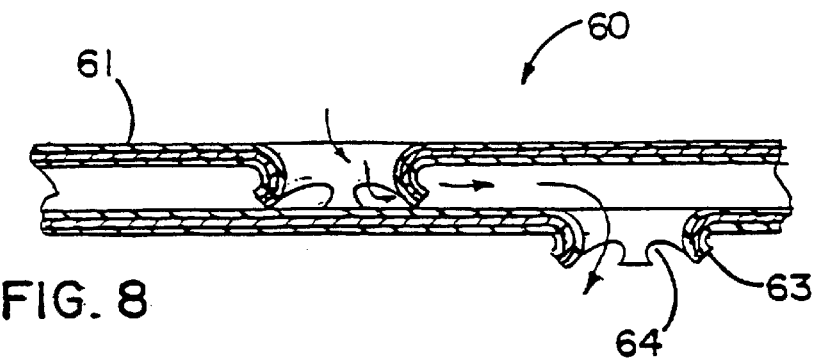

The surface irregularities on the plates 41 which maintain the annular space between adjacent plates 41 need not be of any particular shape. FIGS. 7 and 8 illustrate examples of erosion barriers 50 and 60, respectively, having plates formed with different types of surface irregularities. In FIG. 6, each of a plurality of perforated, cylindrical plates 51 has indentations such as dimples or grooves formed in one surface at regular intervals to define projections 53 on the opposite surface. The plates 51 are mounted around the filtering layers 23 such that the projections 53 on one plate 51 are staggered with respect to the projections 53 on the other plate 51. As a result, the projections 53 on the outer plate 51 contact the adjoining inner plate 51 without nesting in the indented sides of the projections 53 in the inner plate 51. The plates 51 are also formed with openings 52 through which fluid can pass and which are staggered so that there is not a line of sight through the openings 52 between the outside of the filter and the filtering layers 23 surrounded by the erosion barrier 50. In the erosion barrier 60 of FIG. 8, each plate 61 has a plurality of holes 62 punched through it in a manner to form a jagged projection 63 surrounding each hole 62 and extending from the surface of the plate 61. Each projection 63 includes a plurality of sections separated by openings 64 through which fluid can pass. Such holes 62 can be formed by standard metalworking techniques. The projections 63 of one plate 61 are staggered with respect to the projections 63 of the adjoining plate 61 so as to be non-nesting. The lower ends of the projections 63 of one plate 61 can contact the other plate 61 to maintain an annular space between adjoining plates 61. At the same time, the openings 64 in the projections 63 provide a path for fluid flow through the plates 61, as shown by the arrow in the figure. To prevent the projections 63 on the radially innermost plate 61 (the lower plate in FIG. 8) from scratching the filtering layers 23 or other layers which it adjoins, a drainage mesh or other protective layer may be disposed between the innermost plate 61 and the filtering layers 23, or the innermost plate 61 may be subjected to light rolling or other operation to blunt the edges of the projections 63. A drainage layer may also be disposed around the outer plate 61.

Like the plates 41 of the embodiment of FIG. 5, the plates 51, 61 of FIGS. 7 and 8 are preferably formed of or coated with a material having good erosion resistance on at least the upstream sides of the plates, such as any of the materials described with respect to the preceding embodiments.

As with the embodiment of FIG. 5, the annular space formed between adjoining plates 51, 61 of the embodiments of FIGS. 7 and 8 can serve not only as a pathway for fluid between the plates but also as a space where sand or other particles can be entrapped to form a plug should the outer plate be eroded through.

Instead of or in addition to the plates in the embodiments of FIGS. 5–8 having surface irregularities to maintain a spacing between adjoining plates, a separate member may be disposed between adjoining plates to maintain a desired spacing between them. For example, the erosion barrier may comprise a plurality of smooth perforated plates separated by a drainage layer, such as a mesh, to maintain an annular space through which fluid can flow.

An annular space between two adjoining layers for the accumulation of sand is not limited to one disposed between two layers of an erosion barrier. For example, such a space can be formed between an erosion barrier and a radially adjoining region of the filter (such as between an erosion barrier and a filtering layer 23), or it may be formed between adjoining filtering layers 23. For example, an annular space for trapping sand particles can be formed between adjoining filtering layers 23 by one or more layers of a mesh disposed between the layers.

Figure 9:
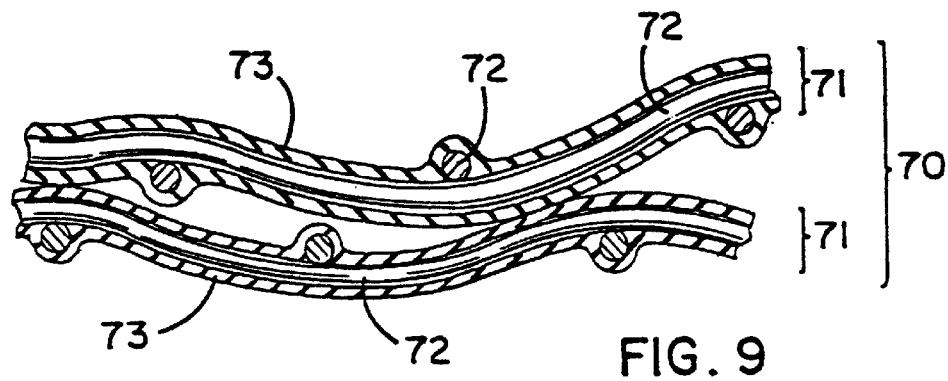
FIG. 9 is a longitudinal cross-sectional view of a portion of an embodiment of an erosion barrier comprising a plurality of mesh layers.

FIG. 9 illustrates another example of an erosion barrier 70 which can be used in the present invention. This example comprises a plurality of mesh layers 71 disposed on the upstream side of unillustrated filtering layers 23. Each mesh layer 71 has a surface formed of an erosion resistant material on at least the upstream side of the mesh layer 71. The mesh layers 71 are formed from a plurality of strands 72. The openings defined between the strands 72 of one mesh layer 71 are staggered with respect to the openings in the adjoining mesh layer 71 to prevent or limit line-of-sight flow through the openings of adjoining mesh layers 71.

The strands 72 of the mesh layers 71 may themselves be formed of materials having good erosion resistance, such as elastomers, dead soft materials, or extremely hard materials. Alternatively, the strands 72 may be coated with an erosion resistant material, either before or after the strands 72 are formed into a mesh, in which case it is not important if the strands 72 themselves are erosion resistant. In the present embodiment, stainless steel strands 72 are covered with an elastomeric coating 73 after being formed into a mesh layer 71 to provide erosion resistance. A coating 73 can be easily formed in various manners, such as by dipping.

There is no restriction on the type of weave of the mesh layers 71. In FIG. 9, each mesh layer 71 has a simple rectangular weave, although a less open weave, such as a twill weave, can also be employed. If the weave is sufficiently closed, a single mesh layer 71 may be adequate to prevent line-of-sight flow of particles to the filtering layers 23.

When the strands 72 are covered with an erosion resistant coating 73, the strands 72 can be made of any material having the desired strength and corrosion resistance, including both metals and polymers, and need not have erosion resistance. Each strand 72 may be either a monofilament or a member such as yarn comprising multiple filaments. Strands 72 formed of yarns are particularly advantageous because if the strands 72 are eroded by sand particles, the filaments forming the yarn tend to unravel to form a fuzzy mass of fibers which restrict the migration of sand particles away from the region where erosion has taken place, thereby promoting the formation of a sand plug which resists further erosion. One example of a suitable material which can be used to form yarn-like strands 72 is Kevlar, which is a trademark of DuPont for an aromatic polyamide fiber.

When the erosion barrier 70 includes a plurality of mesh layers 71, the layers may be discrete members which are separately disposed around the filtering layers 23, or a single mesh may be wrapped around the filtering layers 23 a plurality of times in any suitable manner, such as spirally or helically, to form a plurality of layers.

An alternative to a mesh layer is a string-wound erosion barrier comprising one or more strands of an erosion resistant material wrapped on the filter on the upstream side of the filtering layers 23. A variety of materials can be used for the strands, such as a very hard material, an elastomeric material, or a dead soft material, and the strands can be in a wide variety of shapes, including wires, ribbons, and webs. The strands will normally be wrapped in a criss-cross pattern typical of a string-wound filter, with the direction of winding varying over the radius of the erosion barrier so as to define spaces between strands through which fluid can flow without there being a line-of-sight path through the erosion barrier. The strands may also include a material, such as yarn, which can fray when eroded to form a fuzzy mass of fibers which inhibit edgewise migration of particles.

Figure 10:
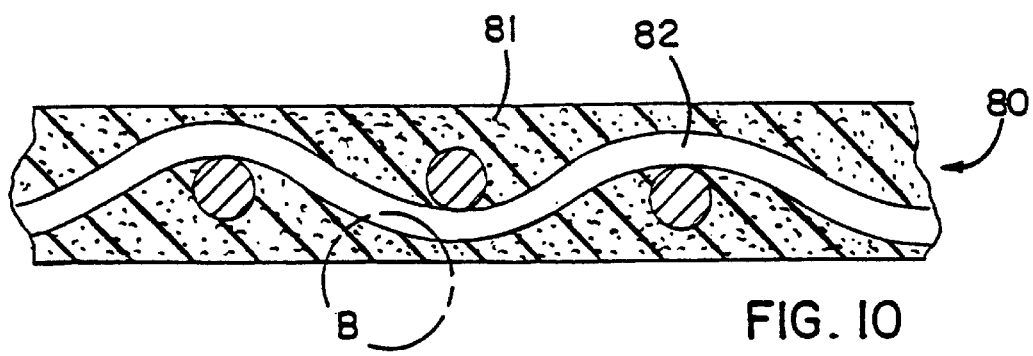
FIG. 10 is a longitudinal cross-sectional view of a portion of an embodiment of an erosion barrier comprising a porous foam.
Figure 11:
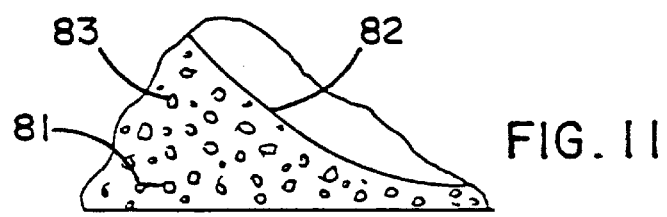
FIG. 11 is an enlarged view of region B of FIG. 10.

FIG. 10 illustrates another example of an erosion barrier 80 for use in the present invention. This example comprises a porous layer 81 of an erosion resistant material disposed on the upstream side of unillustrated filtering layers 23. The porous layer 81 is sufficiently porous that the fluid being filtered can easily flow through the porous layer 81 to reach the filtering layers 23 and yet not so porous that there is a line-of-sight path for fluid through the porous layer 81. The porous layer 81 may comprise a variety of materials. In the present embodiment, it comprises a porous, resilient, open-celled foam of an energy absorbing material such as an elastomer, as shown in FIG. 11, which is an enlarged view of region B of FIG. 10. Examples of suitable elastomers include urethane rubber, Viton, silicone rubber, and nitrile rubber. However, any resilient material capable of being formed into a foam and having good energy absorbing properties may be used.

To protect the porous layer 81 against crushing loads which could compact the porous layer 81 and restrict fluid flow through it, the porous layer 81 may be reinforced, either externally or internally. For example, as shown in FIG. 10, the porous layer 81 may contain a mesh 82 able to resist crushing loads in a direction normal to the surface of the porous layer 81, with the mesh 82 being substantially or entirely surrounded by the elastomeric foam. Such a mesh 82 can be formed of any material having adequate strength and compatibility with the fluid being filtered, such as any of the materials described with respect to the mesh layers 71 of FIG. 9, including both metals and polymers. Yarns are particularly suitable for forming the mesh 82 when there is the possibility of the foam eroding through to the mesh 82, for the same reasons described above with respect to the mesh layers 71 of the embodiment of FIG. 9. An example of external reinforcement for the porous layer 81 is a pair of perforated cylinders separated by a cylindrical gap between which the porous layer 81 is disposed. The surfaces of the cylinders opposing the porous layer 81 may be either smooth or formed with surface irregularities, such as embossing.

The erosion barrier 80 may further include a porous layer which is disposed on the upstream or downstream surfaces of the porous layer 81 and which is formed of a material which frays when eroded by particles in the fluid being filtered. An example of such a porous layer is a mesh formed of yarn strands or a highly open woven or nonwoven fabric formed of strands of yarn. When a portion of the outer periphery of the filter wears through due to erosion and sand particles penetrate to the upstream side of the erosion barrier 80, the strands in the porous layer on the upstream surface will fray to form a fuzzy mass of fibers which inhibit the lateral migration of sand particles which accumulate on the upstream side of the erosion barrier 80. The fibers thereby tend to immobilize the sand particles and reduce the effects of erosion. Kevlar fibers are particularly suitable for forming such a porous layer because of their high strength.

A porous layer formed of a yarn or other material which can fray when eroded can be used in locations outside of an erosion barrier. For example, it can be disposed between layers of a filter medium or next to a drainage layer of a filter.

The porous layer 81 can be disposed around the filtering layers 23 in a variety of manners. It may be in the form of a cylindrical sleeve which is slipped axially over the filtering layers 23. Alternatively, it may be in the form of a sheet of material which is wrapped around the filter body spirally, helically, or cylindrically, for example. If desired, a drainage layer may be disposed along the inner or outer periphery of the erosion barrier 80, but since layer 81 is porous, a drainage layer may be unnecessary.

The elastomeric foam in the porous layer 81 may contain particles 83 of a hard material having resistance to wear by sand and other materials in the fluid being filtered to give the porous layer 81 additional erosion resistance. Such particles 83 will typically have a hardness greater than or equal to the hardness of the abrasive particles in the fluid being filtered. A few examples of suitable particles 83 are sand, a hard ceramic, or a hard metal such as silicon carbide or tungsten carbide.

Instead of comprising a foam, a porous layer may comprise particles held together by a binder to form a porous matrix through which fluid to be filtered can pass. The particles can be of various types. For example, the particles can be made of a resilient energy absorbing material, such as an elastomer, which absorbs the energy of particles in the fluid being filtered, a dead soft material such as tin or lead, or a very hard material which is not eroded by contact with the particles in the fluid being filtered. Examples of such hard particles are sand particles, hard ceramics, or hard metals, such as silicon carbide or tungsten carbide. Like the porous foam of the embodiment of FIG. 10, the porous matrix may be internally or externally reinforced to prevent crushing. Alternatively, it may be a monolithic sleeve without reinforcement.

Figure 12:
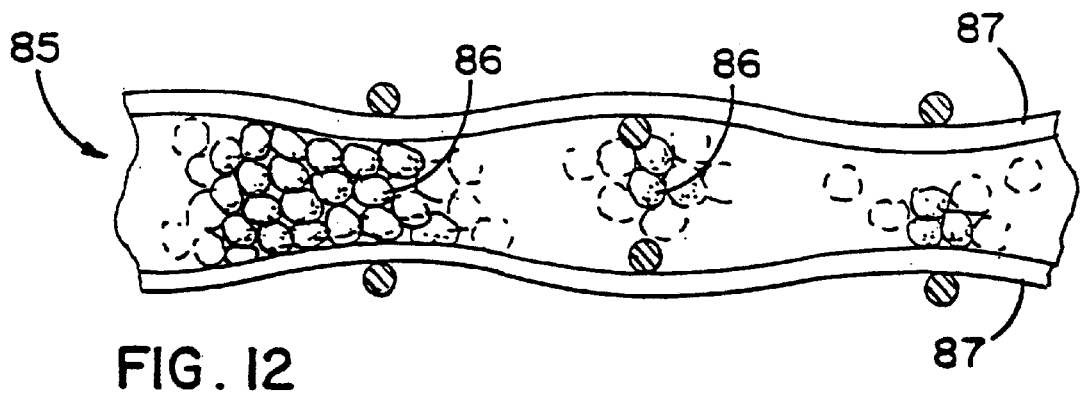
FIG. 12 is a longitudinal cross-sectional view of a portion of another embodiment of an erosion barrier containing a porous matrix of erosion resistant particles.

FIG. 12 is a longitudinal cross-sectional view of a portion of an embodiment of an erosion barrier 85 including a porous matrix of hard particles 86 held together by means of a binder. To give the porous matrix support, it is sandwiched between two mesh layers 87. In this embodiment, the particles 86 are made of a silicon carbide and are consolidated with each other by an elastomeric Viton binder. Nonelastomeric materials can be used as a binder, such as epoxy resins or brazing alloys, but an elastomer (such as Viton or a urethane rubber) is particularly suitable when it is desired for the erosion barrier 85 to have some flexibility, such as when it is to be wrapped around filtering layers 23, since an elastomeric binder will permit the erosion barrier 85 to bend while connecting the particles 86 to each other. The mesh layers 87 may but need not be made of an erosion resistant material. Mesh layers 87 formed of strands of yarn are particularly suitable because the strands will fray when eroded to inhibit edgewise movement of sand particles. An example of a particularly suitable material for the strands of the mesh layers 87 is Kevlar. A highly open woven or nonwoven fabric formed of strands of yarn may be used instead of the mesh layers 87 to support one or both sides of the matrix of particles 86. Like a mesh layer formed of yarn, a fabric formed of yarn can fray to form a fuzzy mass which inhibits edgewise flow of particles when erosion takes place.

The particles 86 forming the matrix may range in size from very fine particles (such as 200 mesh particles) to very coarse ones ($1/16$ inch in diameter or larger), with particles range in size from 8 mesh to 30 mesh being typical.

An example of a method of forming the erosion barrier 85 of FIG. 12 is as follows. Particles 86 of silicon carbide measuring 16 grit in size are thoroughly mixed with a urethane binder. A layer of the mixture of particles 86 and binder is applied with a trowel atop a lower mesh layer 87 to a thickness of approximately $1/8$ inch. The mesh layer 87 comprises a square weave mesh of strands of Kevlar. Prior to use, the mesh layer 87 is coated with an epoxy resin binder to make it easier to handle and to maintain the spacing between strands of the mesh layer 87. An upper mesh layer 87 similar to the lower mesh layer 87 is then placed atop and in contact with the layer of particles 86 and binder. When the binder cures, the particles 86 adhere to each other and to the mesh layers 87 to form a porous matrix which is secured to the two mesh layers 87. The erosion barrier 85 comprising the porous matrix and the mesh layers 87 can then be installed on a filter in the same manner as the other embodiments of erosion barriers. For example, it can be wrapped around the filtering layers to form one or more layers, or it may be formed into a cylinder and slid over the filtering layers. If desired, drainage layers may be disposed along the inner or outer periphery of the erosion barrier 85.

The porosity of the matrix may be such that it performs substantially no removal of particles from the fluid passing through it, or it may be such that a significant amount of particle removal takes place. For example, the porous matrix may be used as a prefilter for the filtering layers 23 which it surrounds. If the removal rating of the porous matrix is sufficient, the porous matrix may even be used as the sole filter medium in a filter. An example of a typical porosity for the matrix is in the range of approximately 40% to approximately 50%.

Figure 13:
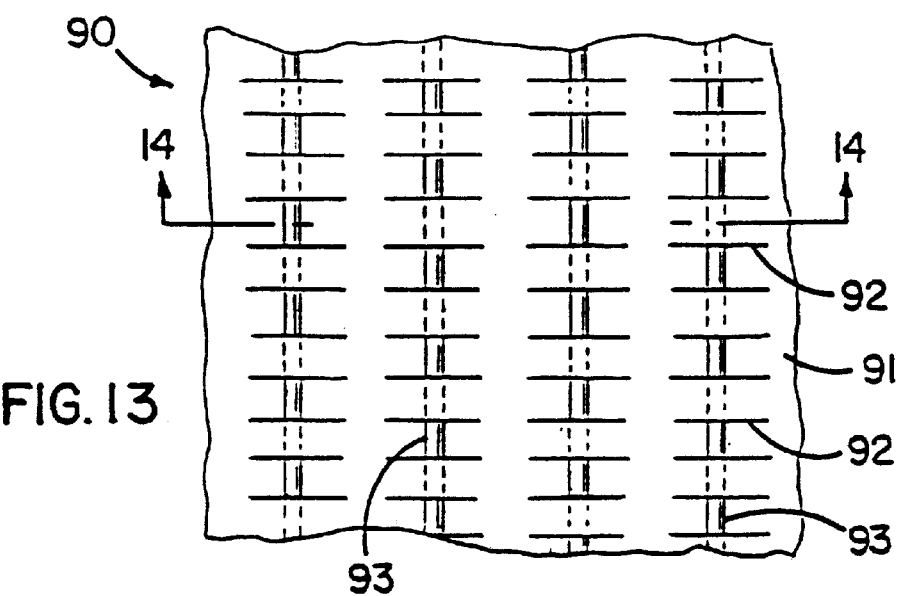
FIG. 13 is a plan view and FIG. 14 is a cross-sectional view of another embodiment of an erosion barrier.
Figure 14:
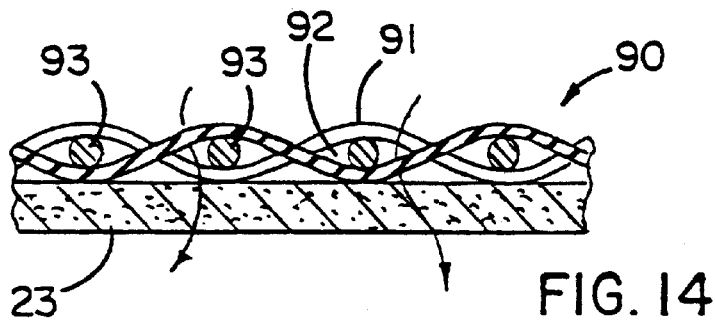

FIGS. 13 and 14 are respectively a plan view and a cross-sectional view taken along line 14—14 of FIG. 13 of another embodiment of an erosion barrier 90 which can be employed in the present invention. This erosion barrier 90 comprises a sheet 91 of a material having good resistance to erosion by particles in the fluid being filtered, such as an elastomer, a dead soft material, a ceramic or other extremely hard material, or any other of the materials described above with respect to the preceding embodiments. The sheet 91 has a plurality of narrow slits 92 formed in it. One or more wires 93 or other members are passed through the slits 92 to hold the slits 92 open so that a fluid to be filtered can pass through the slits 92. The sheet 91 is sufficiently flexible that when the wires 93 are removed, the slits 92 will automatically close so as to substantially prevent particles from passing through them. In addition to holding the slits 92 open, the wires 93 expand the sheet 91 in the thickness direction so as to give the sheet 91 an irregular surface. When the sheet 91 is disposed against another surface, the surface irregularities create spaces for fluid flow between the sheet 91 and the adjoining surface. Because the slits 92 are narrow, a fluid must flow generally parallel to the surface of the sheet 91 in order to pass through the slits 92, so the slits 92 can reduce line-of-sight flow between the outside of the filter and the filtering layers 23. However, when the erosion barrier 90 comprises only a single layer, some line-of-sight flow may still be possible. Therefore, the erosion barrier 90 may comprise a plurality of layers with the slits 92 in different layers being staggered with respect to each other. For example, the erosion barrier 90 may be wrapped around the filtering layers 23 more than once to create a plurality of layers. Alternatively, an erosion barrier 90 having a single layer may be used in conjunction with another erosion barrier of the same or different type, so that the two erosion barriers together can prevent line-of-sight flow. The wires 93 for maintaining the slits 92 open may extend in various directions, such as in either the axial or the circumferential direction of the filter. If desired, a drainage layer may be disposed on either the upstream or downstream sides of the erosion barrier 90.

The wires 93 preferably have a level of erosion resistance which is lower than that of the sheet 91. If the wires 93 are more likely to erode than the sheet 91, in the event that there is localized erosion of the exterior of the filter and sand at high velocity impinges on the erosion barrier 90, the wires 93 will wear through before the sheet 91 does. When the wires 93 wear through, the corresponding slits 92 will close, thereby preventing sand from passing through the sheet 91 where the slits 92 are closed and distributing flow away from the region where erosion is occurring. At the same time, the wires 93 are preferably sufficiently resistant to sand erosion not to be worn through by the sand which it contacts during normal operation. Therefore, by suitably selecting the erosion resistance of the wires 93, the erosion barrier 90 can function as a fuse which locally closes off the sheet 91 in a region where erosion of the filter is taking place. In wells for oil or gas, a corrosion resistant metal such as stainless steel is frequently a suitable material for the wires 93, but nonmetals such as polymers can also be used.

When the sheet 91 is formed of an elastomer or similar material, it may comprise a solid layer in which slits 92 are cut. However, when the sheet 91 is formed from a more rigid material such as a dead soft metal or an extremely hard material, it may be more suitable for the sheet 91 to be in the form of a woven or nonwoven fabric of strips or fibers of the material to enable the sheet 91 to have sufficient flexibility for the slits 92 to automatically close when the wires 93 are removed.

The various erosion barriers described above may be used in combination with one another. For example, the erosion barrier 40 of FIG. 5 may be concentrically disposed with respect to one or more of the erosion barriers 70 of FIG. 11, the erosion barrier 80 of FIG. 12, the erosion barrier 85 of FIG. 14, etc.

An erosion barrier according to the present invention will usually be disposed on at least the upstream side of a filter medium which is to be protected. If fluid flow through the filter during filtration will normally be radially inwards, the erosion barrier may be disposed radially outwards of the filter medium, as in the illustrated embodiments. However, if fluid flow is normally radially outwards through the filter medium, the erosion barrier may be installed on the radially inward side of the filter medium.

In the illustrated embodiments, an erosion barrier is disposed only on the upstream side of a filter medium, e.g., on the upstream side of filtering layers 23, but it is possible for an erosion barrier to be disposed on the downstream side of a filter medium as well, or only on the downstream side. An erosion barrier disposed on the downstream side of a filter medium may allow a quantity of sand or other particles which have eroded through the filter medium to "pack" into the eroded areas to form a plug and stop further erosion. In addition, an erosion barrier may be disposed between layers of a filter medium. For example, in the embodiment of FIG. 2, in addition to the illustrated erosion barrier 25, another erosion barrier may be disposed between two of the adjoining filtering layers 23.

What is claimed is:

1. A filter for a subterranean well comprising:
   a filter medium for removing particles from a well fluid having an upstream side and a downstream side; and
   an erosion barrier disposed along a common flow path with the filter medium for preventing erosion by particles in the well fluid and comprising a layer having an upstream surface comprising an elastomeric material.

2. A filter as claimed in claim 1 wherein the filter medium comprises a metallic medium.

3. A filter for use in a subterranean well comprising:
   a filter medium for removing particles from a well fluid having an upstream side and a downstream side; and
   an erosion barrier disposed along a common flow path with the filter medium for preventing erosion by particles in the well fluid and comprising a mesh having an upstream surface comprising an erosion resistant material.

4. A filter as claimed in claim 3 wherein the mesh comprises strands formed of a yarn which frays when eroded by particles in the well fluid.

5. A filter as claimed in claim 3 wherein the erosion resistant material comprises an energy absorbing material.

6. A filter as claimed in claim 5 wherein the erosion resistant material comprises an elastomer.

7. A filter as claimed in claim 3 wherein the erosion resistant material comprises a dead soft material.

8. A filter as claimed in claim 3 wherein the erosion resistant material comprises a material at least as hard as the particles in the well fluid.

9. A filter as claimed in claim 3 wherein the mesh comprises strands which are coated with the erosion resistant material.

10. A filter as claimed in claim 3 wherein the erosion barrier includes first and second concentric layers of mesh each having an upstream surface comprising an erosion resistant material.

11. A filter as claimed in claim 10 wherein the first mesh layer has openings which are staggered with respect to openings in the second mesh layer.

12. A filter for use in a subterranean well comprising:
    a filter medium for removing particles from a well fluid having an upstream side and a downstream side; and
    an erosion barrier disposed along a common flow path with the filter medium for preventing erosion by particles in the well fluid and comprising a porous matrix of erosion resistant particles held together with a binder.

13. A filter as claimed in claim 12 wherein the erosion barrier includes a support member of a material which frays when eroded by particles in the well fluid supporting the matrix.

14. A filter as claimed in claim 12 wherein the porous layer comprises a sleeve.

15. A filter as claimed in claim 12 wherein the erosion barrier comprises a sheet which is wrapped in a plurality of turns.

16. A filter as claimed in claim 12 wherein the erosion resistant particles comprise a resilient energy absorbing material.

17. A filter as claimed in claim 16 wherein the erosion resistant particles comprise elastomeric particles.

18. A filter as claimed in claim 12 wherein the erosion resistant particles comprise a dead soft material.

19. A filter as claimed in claim 12 wherein the erosion resistant particles comprise a material at least as hard as the particles in the well fluid.

20. A filter as claimed in claim 12 wherein the erosion barrier includes a reinforcing member to prevent crushing.

21. A filter as claimed in claim 20 wherein the reinforcing member is secured to the porous matrix.

22. A filter as claimed in claim 12 wherein the porous matrix is sandwiched between first and second mesh layers.

23. A filter as claimed in claim 22 wherein the mesh layers comprise a material which frays when eroded by particles in the well fluid.

24. A filter as claimed in claim 22 wherein the mesh layers are secured to the porous matrix.

25. A filter as claimed in claim 24 wherein the mesh layers are secured to the porous matrix by the binder.

26. A filter as claimed in claim 12 wherein the binder comprises an elastomeric binder.

27. A filter as claimed in claim 12 wherein the erosion resistant particles have a size from 8 mesh to 30 mesh.

28. A filter as claimed in claim 12 wherein the porous matrix has a porosity of approximately 40% to approximately 50%.

29. A filter as claimed in claim 12 wherein the porous matrix performs substantially no removal of particles from the well fluid passing through the porous matrix.

30. A filter as claimed in claim 12 wherein the porous matrix can function as a prefilter for the filter medium.

31. A filter for use in a subterranean well comprising:
    a filter medium for removing particles from a well fluid having an upstream side and a downstream side; and
    an erosion barrier disposed on the downstream side of the filter medium and having an upstream surface formed of an erosion resistant material.

32. A filter for use in a subterranean well
a filter medium for removing particles from a well fluid having an upstream side and a downstream side and comprising a plurality of filtering layers; and
an erosion barrier disposed between two of the filtering layers and having an upstream surface formed of an erosion resistant material.

33. A filter for use in a subterranean well comprising:
a filter medium for removing particles from a well fluid having an upstream side and a downstream side; and
a porous layer disposed along a common flow path with the filter medium and comprising a material which frays when eroded by particles in the well fluid to form a fuzzy mass of fibers inhibiting edgewise movement of the particles within the filter.

* * * * *